US011652876B2

United States Patent
Emmanuel et al.

(10) Patent No.: US 11,652,876 B2
(45) Date of Patent: May 16, 2023

(54) ASSISTED DELIVERY SERVICE FOR NETWORKS

(71) Applicant: Rovi Guides, Inc., San Jose, CA (US)

(72) Inventors: Daina Emmanuel, Bangalore (IN); Padmassri Chandrashekar, Karnataka (IN); Reda Harb, Bellevue, WA (US)

(73) Assignee: ROVI GUIDES, INC., San Jose, CA (US)

( * ) Notice: Subject to any disclaimer, the term of this patent is extended or adjusted under 35 U.S.C. 154(b) by 0 days.

(21) Appl. No.: 17/383,055

(22) Filed: Jul. 22, 2021

(65) Prior Publication Data

US 2023/0023528 A1 Jan. 26, 2023

(51) Int. Cl.
*H04L 67/1061* (2022.01)
*H04L 67/52* (2022.01)

(52) U.S. Cl.
CPC .......... *H04L 67/1061* (2013.01); *H04L 67/52* (2022.05)

(58) Field of Classification Search
CPC . H04L 41/12; H04L 41/0816; H04L 67/1061; H04L 67/18
See application file for complete search history.

(56) References Cited

U.S. PATENT DOCUMENTS 10,470,060 B1    11/2019  Paranjpe et al.
10,691,718 B2 *   6/2020  Koorapati ............ G06F 16/172
10,771,524 B1     9/2020  Long et al.
2009/0024754 A1*  1/2009  Setton ................. H04L 67/1085
                                                                709/231
2012/0054818 A1*  3/2012  Noh ..................... H04N 21/222
                                                                725/143

(Continued)

OTHER PUBLICATIONS

Merani et al. Adaptive Streaming in P2P Live Video Systems: A Distributed Rate Control Approach, May 2016, ACM Trans. Multimedia Comput. Commun. Appl. vol. 12, No. 3, Article 46, p. 1-23 (Year: 2016).*

(Continued)

*Primary Examiner* — Tonia L Dollinger
*Assistant Examiner* — Joseph M Cousins
(74) *Attorney, Agent, or Firm* — Haley Guiliano LLP

(57) ABSTRACT

Systems and methods are provided for switching computing devices between edge servers and peer groups. One example method includes receiving, at a client computing device and from a first computing device, media content. A request to initiate an assisted delivery service is sent from the client computing device to a second computing device. The assisted delivery service is initiated in response to the request. The assisted delivery service comprises identifying, at the second computing device, one or more peer computing devices receiving the media content. At the second computing device, instructions that enable the client computing device to discover at least one of the peer computing devices are generated. The instructions are sent from the second computing device to the client computing device. At the client computing device, a peer computing device is discovered. A request to receive a portion of the media content is sent from the client computing device to a discovered peer computing device. The portion of the media content is received at the client computing device from the peer computing device.

20 Claims, 9 Drawing Sheets

(56) References Cited

U.S. PATENT DOCUMENTS

| | | | |
|---|---|---|---|
| 2015/0180795 A1* | 6/2015 | El-Ansary | H04L 67/1061 |
| | | | 709/226 |
| 2016/0057185 A1* | 2/2016 | Zhang | H04L 67/104 |
| | | | 709/231 |
| 2017/0346888 A1* | 11/2017 | Kim | H04L 67/107 |
| 2020/0028896 A1* | 1/2020 | Veldanda | H04W 76/12 |
| 2020/0128255 A1* | 4/2020 | Halepovic | H04N 19/176 |
| 2020/0336535 A1* | 10/2020 | van Gassel | H04L 67/1008 |
| 2020/0351317 A1* | 11/2020 | Yousef | H04L 65/60 |
| 2022/0193551 A1* | 6/2022 | Delmas | A63F 13/352 |

OTHER PUBLICATIONS

Velasco L., et al., "A Service-Oriented Hybrid Access Network and Clouds Architecture," IEEE Communications Magazine, vol. 53, No. 4, pp. 159-165, Apr. 2015,.

Osama Abboud et al: "Quality Adaptive Peer-to-Peer Streaming Using Scalable Video Coding", Advances in Biometrics pp. 41-54, (2009).

Zhang et, "Unreeling Xunlei Kankan: Understanding Hybrid CDN-P2P Video-on-Demand Streaming", IEEE Transactions on Multimedia, 17(2):229-242 (2015).

* cited by examiner

ASSISTED DELIVERY SERVICE FOR NETWORKS

BACKGROUND

The present disclosure is directed towards systems and methods for switching computing devices between edge servers and peer groups. In particular, systems and methods are provided herein that enable computing devices to be switched between edge servers and peer groups in order to enable improved delivery of media content to a computing device.

SUMMARY

With the proliferation of media streaming services, there has been a large increase in the bandwidth required to deliver media items from a content delivery network (CDN) to computing devices requesting the media items. Typically, a CDN comprises one or more edge servers that store media items. The media items are typically delivered from an edge server local to a requesting computing device via the internet. In order to mitigate this bandwidth requirement, some streaming providers enable media items to be delivered to an end user via a peer-to-peer CDN in addition to a purely server-based CDN. For example, if a smart TV requests an on-demand video from an over-the-top streaming (OTT) service, the streaming service may first check to see if there are any other computing devices that have already received the on-demand video and are storing at least a part of the video locally. For example, a tablet device may store a part of an on-demand video locally. The OTT service can instruct the smart TV to request the stored part of the on-demand video from the tablet, thereby reducing the bandwidth required between the smart TV and an edge server of the CDN network. In some examples, the smart TV may then store parts of the on-demand video and may send the parts to one or more other computing devices. If a number of computing devices are receiving a stream for, for example, a live soccer match, a server (i.e., a tracker) may coordinate the computing devices such that each of the computing devices receives portions (or segments or fragments) of the live stream from a plurality of the other computing devices that are receiving the live stream. However, in order to deliver media content reliably to a computing device, there may be some circumstances where it is preferable to deliver a media item (or parts of a media item) from an edge server, and there may be other circumstances where it is preferable to deliver a media item (or parts of a media item) via a peer-to-peer CDN.

In view of the foregoing, it would be beneficial to have a system that is capable of seamlessly switching a computing device between an edge server and a peer-to-peer CDN.

Systems and methods are described herein for switching computing devices between edge servers and peer groups. In accordance with an aspect of the disclosure, a method is provided for switching computing devices between edge servers and peer groups. The method includes receiving, at a client computing device and from a first computing device, media content. A request to initiate an assisted delivery service is sent from the client computing device to a second computing device. The assisted delivery service is initiated at the second computing device in response to the request. The assisted delivery service comprises identifying, at the second computing device, one or more peer computing devices receiving the media content. Discovery data that enables the client computing device to discover at least one of the peer computing devices is generated at the second computing device. The discovery data is sent from the client computing device to a second computing device. A peer computing device is discovered, based on the discovery data and at the client computing device. A request to receive a portion of the media content is sent from the client computing device to a discovered peer computing device. The portion of the media content is received at the client computing device, from the peer computing device. The client computing device may request the initiation of the assisted delivery service in response to detecting an error-state when receiving media content from the first computing device. At least a portion of the media content may be stored in a buffer at the client computing device, and the request to initiate the assisted delivery service may be sent when the buffer is storing at least a threshold amount of the media content. A portion of the media content may be sent from the client computing device to a peer computing device. In an example system, a user uses a media player running on a smartphone to stream media content, such as a soccer match, from an edge server. If the user experiences playback issues, such as buffering of the stream, due to, for example, an issue with a network path between the edge server and the smartphone, then the media player may utilize an assisted delivery service to attempt to improve the delivery of the media content to the media player running on the smartphone. In some examples, the assisted delivery service may be requested in response to detecting an error-state when receiving media content from the edge server. In other examples, the assisted delivery service may be requested when a threshold portion or the entire buffer of the media player is full. The threshold portion may be established to ensure that there is enough content in the buffer to avoid buffering when the media content is requested from a peer. An assisted delivery service may be initiated by sending a request from the smartphone to a server running the assisted delivery service. The server running the assisted delivery service may keep track of other computing devices (peers) that are streaming the same content. On receiving the request from the smartphone, the assisted delivery server may send data to the smartphone that enables the smartphone to discover the peer computing devices that are streaming the same content. On receiving the discovery data, an application running on the smartphone (which, in some examples, may be the media player itself) may communicate with one or more of the peer computing devices and request at least a portion of the media content being streamed. In response to receiving the request, the peer computing device may send the requested portion of the media content to the smartphone. In some examples, the smartphone may stream the media content solely from one or more peer computing devices. In other examples, the smartphone may stream some portions of the media content from the edge server and other portions of the media content from one or more peer computing devices. In some examples, portions of the media content are sent from the smartphone to one or more other peers.

Initiating the assisted delivery service may further comprise sending location data from the client computing device to the second computing device. The location data may indicate a location of the client computing device. Generating the discovery data may further comprise identifying the one or more peer computing devices based on a proximity of the one or more peer computing devices to the client computing device. Updated location data may be sent from the client computing device to the second computing device. One or more additional client computing devices may be identified at the second computing device based on the updated location data. Updated discovery data that enables the client computing device to discover the one or more additional client computing devices may be sent, from the second computing device to the client computing device. For example, the assisted delivery server may send discovery data directing the computing device that is streaming the media content to peers that are in the same zip code as the computing device that is streaming the media content. In some examples, if no peers are present in the same zip code, the area that is considered for peers may be incrementally increased. In some examples, this may take into account the underlying topography of the internet as well as the physical location of the peers. For example, if a first peer device is physically farther away than a second peer device, but the first peer device is closer to a highspeed trunk connection, then the first peer device may be prioritized over the second peer device. The proximity of the computing devices may be calculated based on coordinates obtained via, for example, GPS, GLONASS, BeiDou, Galileo, NavIC and/or QZSS. The computing device that is streaming the media content may periodically poll the assisted delivery server in order to receive updated discovery data. This updated discovery data may take into account movement of the computing device that is streaming the media content and/or movement of the peer devices.

Error-state data may be sent from the client computing device to the second computing device. The error-state data may comprise one or more error-states with respect to the one or more peer computing devices. One or more peer computing devices based on the error-state data may be identified at the second computing device. Updated discovery data that excludes the identified one or more peer computing devices based on error-state data may be generated at the second computing device. The updated discovery data may be sent from the second computing device to the client computing device. For example, if a computing device is streaming media content from one or more peer devices and the computing device experiences an issue receiving one or more portions from one or more of the peer devices then it may be beneficial to send data reflecting the issue to the assisted delivery server. A peer device may, for example, move to an area with a poor connection to the internet, which may prevent it from reliably delivering portions of the media content to other devices. This may present itself as a number of requests that are sent from the computing device to the peer device but for which no response is received. In another example, the time taken to receive portions of the media content from a peer device may considerably increase. The computing device may send data reflecting these scenarios to the assisted delivery server, so that the delivery server can remove and/or deprioritize these peer(s) when sending discovery data.

A maximum display resolution for the media content may be identified at the client computing device. The maximum display resolution may be the highest resolution that is supported by the client computing device or is based on a setting set at the client computing device. Data indicating the maximum supported resolution may be sent from the client computing device to the second computing device. Generating the discovery data may further comprise identifying the one or more peer computing devices based on whether they enable the media content to be delivered to the client computing device at the maximum resolution. For example, a smartphone streaming content may be able to display high definition content at a 1920×1080 resolution; however, only some of the peer devices may have the bandwidth to deliver content at a 1920×1080 resolution, whereas others may only have the bandwidth to deliver content at a 1280×720 resolution. In this example, the assisted delivery server may send discovery data comprising only the peers that have the bandwidth to deliver content at the 1920×1080 resolution. In other examples, the assisted delivery server may send discovery data comprising all peers but may prioritize the peers based on the resolution they are able to deliver.

At least a portion of the media content may be stored in a buffer at the client computing device. Generating the discovery data may further comprise indicating a size of the portion of the media content to be received from a peer computing device. The size of the portion may be determined based on at least one of the amount of media content stored in the buffer and a peer computing device response time. For example, if a user is streaming media content via a smartphone, the cellular signal may vary as the user moves from place to place. If a user has a relatively poor cellular signal, then it may be beneficial for the user to receive smaller portions as they may be received more quickly than larger portions. However, there may an overhead associated with sending lots of small portions, and it may be beneficial to send larger portions if the cellular signal is relatively strong. In order to address this, data may be sent from the smartphone to the server running the assisted delivery service that reflects the network conditions being experienced by the smartphone and/or the amount of content in the buffer. If, for example, the buffer is relatively empty and/or the network conditions are bad, the assisted delivery service may indicate to the one or more peer devices that smaller chunks should be sent, and if the buffer is relatively full and/or the network conditions are good, the assisted delivery service may indicate that larger chunks should be sent.

Generating the discovery data may further comprise identifying one or more peer computing devices based on a predetermined ranking. For example, a record of bandwidth available to each peer, percentage of successfully delivered portions of media content and/or a ratio of how much media content is received from peers and how much media content is sent to peers may be maintained at the assisted delivery service server. When the server sends discovery data, the peers may be prioritized (i.e., the order of connection) based on at least one of these factors.

BRIEF DESCRIPTIONS OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

The above and other objects and advantages of the disclosure may be apparent upon consideration of the following detailed description, taken in conjunction with the accompanying drawings, in which.

Figure 8:
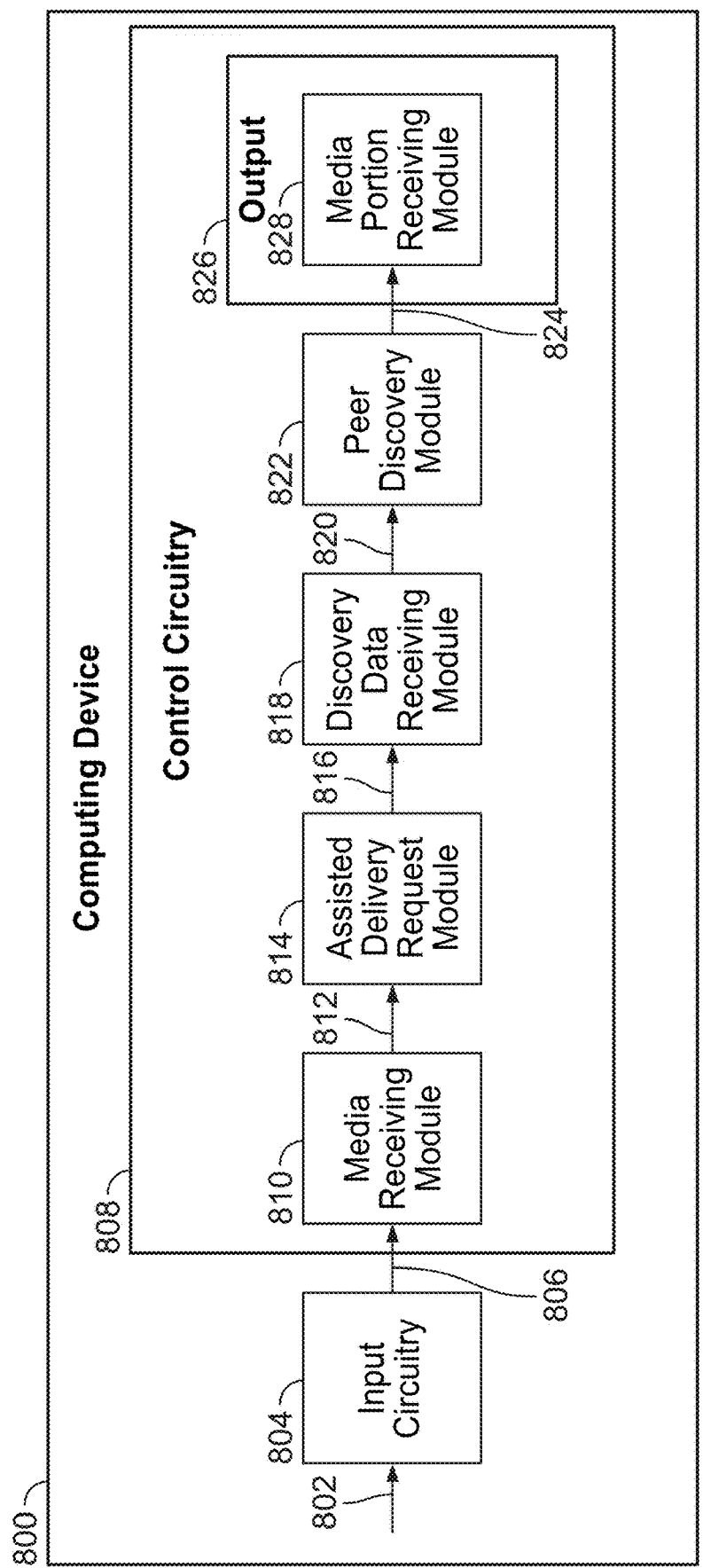
Figure 9:
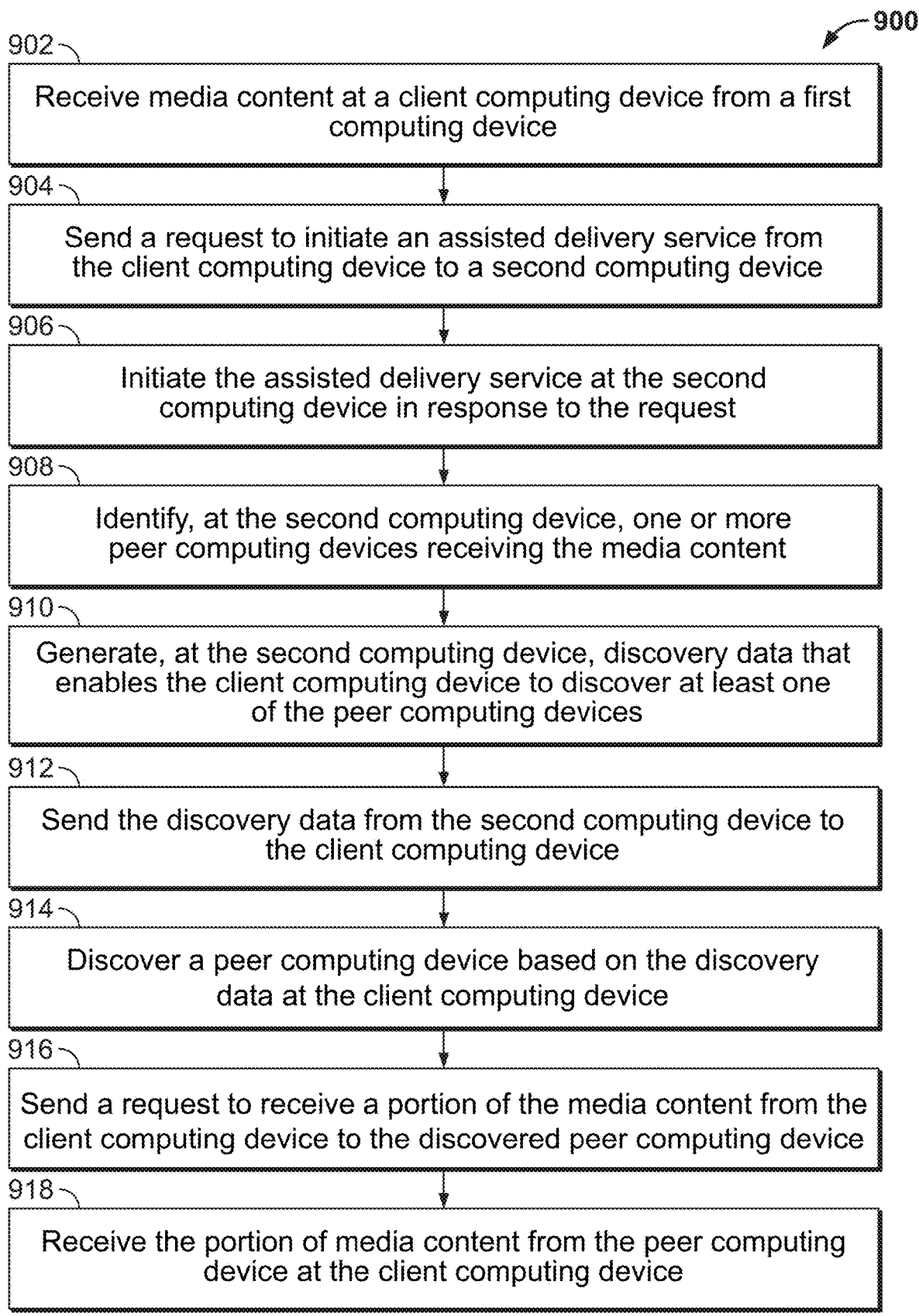

FIG. 8 shows a block diagram representing components of a computing device and data flow therebetween for switching a computing device between an edge server and a peer group, in accordance with some embodiments of the disclosure; and FIG. 9 is a flowchart of illustrative steps involved for switching a computing device between an edge server and a peer group, in accordance with some embodiments of the disclosure.

DETAILED DESCRIPTION

Systems and methods are described herein for switching a computing device between an edge server and a peer group. The disclosed methods and systems may be implemented on a computing device. As referred to herein, the computing device can be any device comprising a processor and memory, for example, a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, an augmented reality device, a mixed reality device, a virtual reality device, or any other television equipment, computing equipment, or wireless device, and/or combination of the same.

The media content may be streamed live and/or streamed on demand to a computing device. On-demand content may also be downloaded to a computing device in response to a user request and/or according to a pre-set rule. Content includes audio, video and/or any other media content. Audio includes audio-only content, such as songs. Video includes audiovisual content such as movies and/or television programs. An over-the-top content platform may be accessed via a website and/or an app running on a computing device.

In embodiments where a computing device, such as a smartphone, and peers communicate directly with each other in a peer-to-peer manner, any method known in the art may be utilized. For example, the peers may communicate via a BitTorrent protocol and/or via a Web Real-Time Communication (WebRTC) protocol. This enables the computing device and the peers to directly communicate with each other and to send media content via a data channel, such as WebRTC data channel. The BitTorrent and/or WebRTC protocol may be directly implemented in an application that received media content. In other examples, a user may be viewing media content via a web browser on a computing device and the web browser may enable a computing device to communicate directly with other peers via the BitTorrent and/or WebRTC protocol. In another example, the computing device may communicate directly with a peer via, for example, Wi-Fi Direct. This enables the computing device to receive media content from peer devices that are relatively close (i.e., as defined by the range of Wi-Fi connection) to one another. Any combination of BitTorrent, WebRTC, Wi-Fi Direct and any other suitable protocol may be utilized.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory, including, but not limited to, volatile and non-volatile computer memory or storage devices such as a hard disk, floppy disk, USB drive, DVD, CD, media cards, register memory, processor caches, random access memory (RAM), etc.

Figure 1:
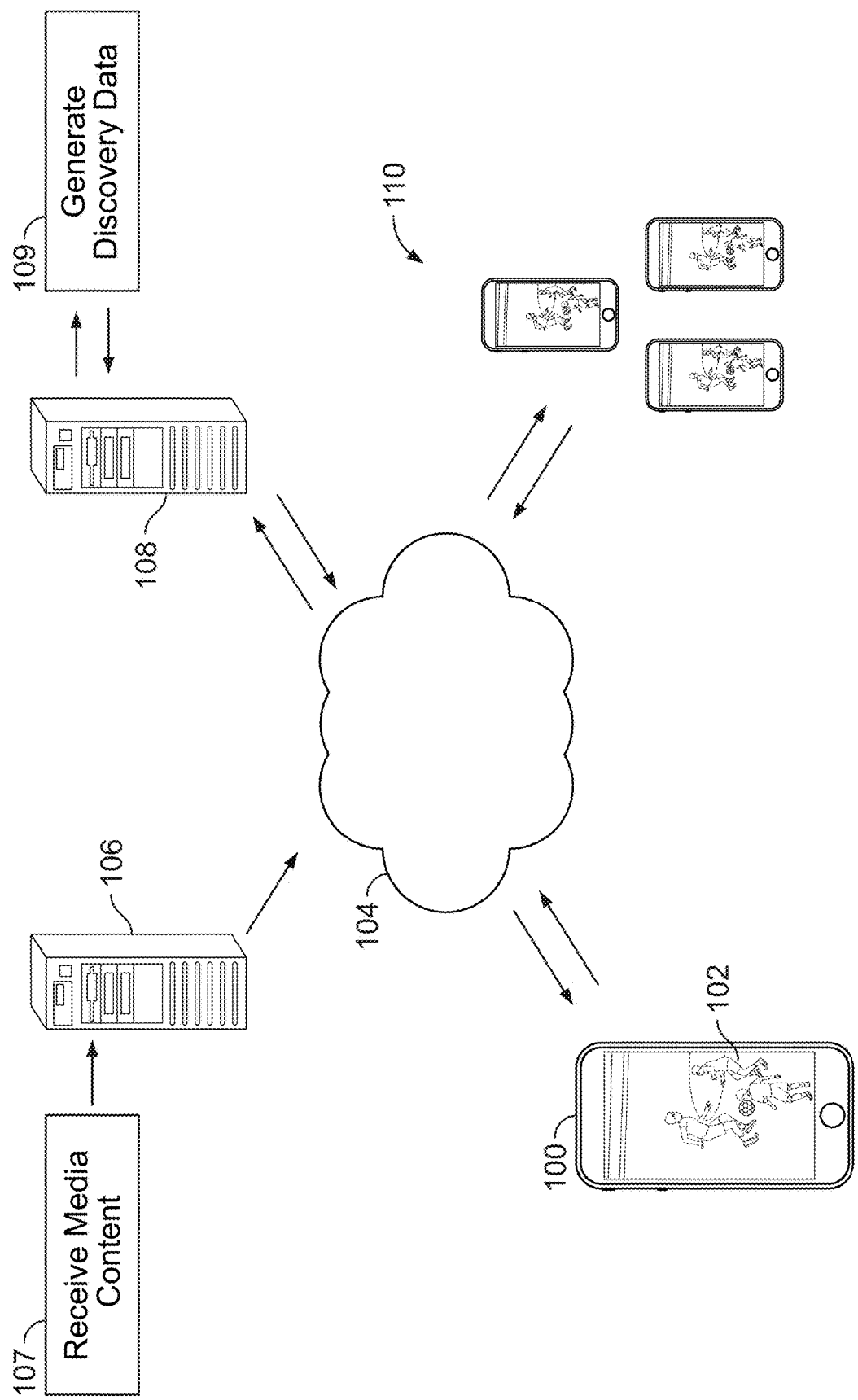
FIG. 1 shows an exemplary environment in which a computing device is switched between an edge server and a peer group, in accordance with some embodiments of the disclosure.

FIG. 1 shows an exemplary environment in which a computing device is switched between an edge server and a peer group, in accordance with some embodiments of the disclosure. A computing device, in this example a smartphone 100 streams media content, in this example a soccer match 102, via a network 104, from a server, in this example an edge server 106. The edge server 106 receives media content 107 from, for example, a broadcaster. The network 104 may be the internet and may comprise wired and/or wireless means for transmitting the streamed soccer match 102 from the edge server 106 to the smartphone 100. A request for an assisted delivery service is sent, from the smartphone 100, via the network 104, to the assisted delivery server 108. In this example, the assisted delivery server 108 is separate from the edge server 106, but in some examples, the functionality provided by the edge server 106 and the assisted delivery server 108 may be combined at a single server. In some examples, there may be more than one assisted delivery server, and the smartphone 100 may send a request to the nearest assisted delivery server and/or the assisted delivery server with the lowest ping. On receiving the request, the assisted delivery server 108 identifies one or more peer computing devices, for example, peer smartphones 110, from which the smartphone 100 can receive one or more portions of the streamed soccer match 102. The assisted delivery server 108 generates discovery data 109 based on the identified peers 110 and sends the discovery data, via the network 104, to the smartphone 100. The discovery data enables the smartphone 100 to discover at least one of the peer computing devices 110 via a network, in this example the network 104. The discovery data may comprise, for example, an IP address and/or a MAC address of one or more peer computing devices 110. In other examples, the peers may be located via a local network (i.e., a Wi-Fi and/or wired network), which is separate from the internet. On receiving the discovery data, the smartphone discovers at least one peer device 110 and sends a request to a peer device 110 for a portion of the media content via the network 104. On receiving the request, the peer device 110 sends the requested portion of the media content via the network 104 to the smartphone 100. An application, such as a media player, running on the smartphone 100 may use the received piece of media content to generate the media content for display. In some examples, the smartphone 100 may receive media content solely from the peer devices 110. In other examples, the smartphone 100 may receive some portions of the media content from the peer devices 110 and other portions of the media content from the edge server 106.

Figure 2:
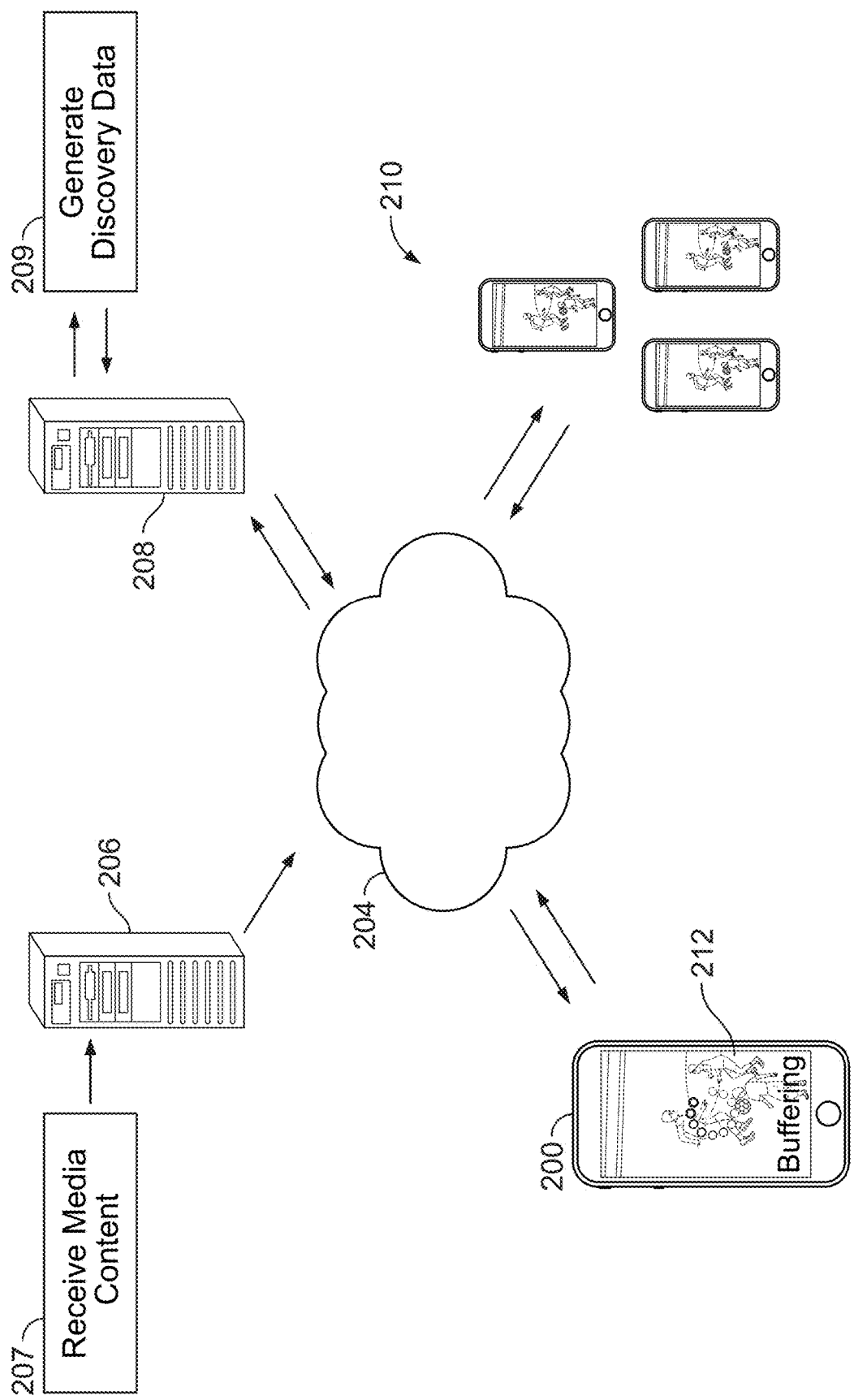
FIG. 2 shows another exemplary environment in which a computing device is switched between an edge server and a peer group, in accordance with some embodiments of the disclosure.

FIG. 2 shows another exemplary environment in which a computing device is switched between an edge server and a peer group, in accordance with some embodiments of the disclosure. The arrangement is similar to that shown in FIG. 1; however, the assisted delivery service is initiated in response to the media content buffering 212 on a computing device, such as a smartphone 200. A computing device, in this example a smartphone 200, streams media content, via a network 204, from a server, in this example an edge server 206. The edge server 206 receives media content 207 from, for example, a broadcaster. The network 204 may be the internet and may comprise wired and/or wireless means for transmitting the streamed media content from the edge server 206 to the smartphone 200. If an issue is detected with the stream, for example at a media player that generates the media content for display, then a request for an assisted delivery service is sent, from the smartphone 200, via the network 204, to the assisted delivery server 208. In this example, the media player detects that the media content is buffering 212. The media player running on the smartphone 200 may send the request in some examples. In other examples, another application running on the smartphone may monitor the content being streamed by the media player and may send the request when buffering is detected. In this example, the assisted delivery server 208 is separate from the edge server 206, but in some examples, the functionality provided by the edge server 206 and the assisted delivery server 208 may be combined at a single server. In some examples, there may be more than one assisted delivery server, and the smartphone 200 may send a request to the nearest assisted delivery server and/or the assisted delivery server with the lowest ping. On receiving the request, the assisted delivery server 208 identifies one or more peer computing devices, for example, peer smartphones 210, from which the smartphone 200 can receive one or more portions of the streamed media content. The assisted delivery server 208 generates discovery data 209 based on the identified peers 210 and sends the discovery data, via the network 204, to the smartphone 200. The discovery data enables the smartphone 200 to discover at least one of the peer computing devices 210 via a network, in this example the network 204. The discovery data may comprise, for example, an IP address and/or a MAC address of one or more peer computing devices 210. In other examples, the peers may be located via a local network (i.e., a Wi-Fi and/or wired network) that is separate from the internet. On receiving the discovery data, the smartphone discovers at least one peer device 210 and sends a request to a peer device 210 for a portion of the media content via the network 204. On receiving the request, the peer device 210 sends the requested portion of the media content via the network 204 to the smartphone 200. An application, such as a media player, running on the smartphone 200 may use the received piece of media content to generate the media content for display. In some examples, the smartphone 200 may receive media content solely from the peer devices 210. In other examples, the smartphone 200 may receive some portions of the media content from the peer devices 210 and other portions of the media content from the edge server 206.

Figure 3:
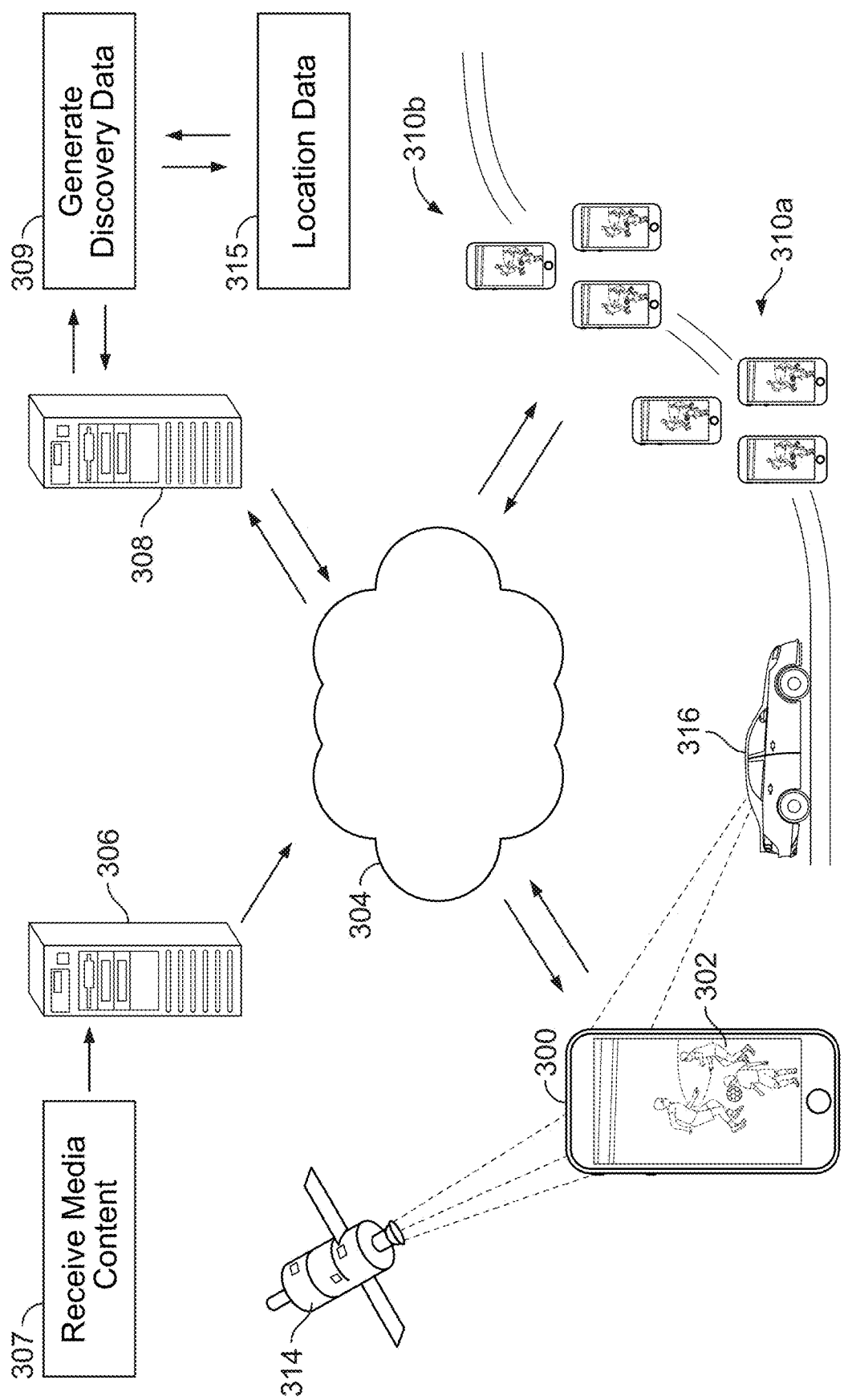
FIG. 3 shows another exemplary environment in which a computing device is switched between an edge server and a peer group, in accordance with some embodiments of the disclosure.

FIG. 3 shows another exemplary environment in which a computing device is switched between an edge server and a peer group, in accordance with some embodiments of the disclosure. The arrangement is similar to that shown in FIG. 1; however, the assisted delivery service takes into account the location of the computing device streaming the media content and the peers from which content is streamed. A computing device, in this example a smartphone 300, streams media content, in this example a soccer match 302, via a network 304, from a server, in this example an edge server 306. The edge server 306 receives media content 307 from, for example, a broadcaster. The network 304 may be the internet and may comprise wired and/or wireless means for transmitting the streamed soccer match 302 from the edge server 306 to the smartphone 300. A request for an assisted delivery service is sent, from the smartphone 300, via the network 304, to the assisted delivery server 308. In this example, the assisted delivery server 308 is separate from the edge server 306, but in some examples, the functionality provided by the edge server 306 and the assisted delivery server 308 may be combined at a single server. In some examples, there may be more than one assisted delivery server, and the smartphone 300 may send a request to the nearest assisted delivery server and/or the assisted delivery server with the lowest ping. On receiving the request, the assisted delivery server 308 identifies one or more peer computing devices, for example, peer smartphones 310, from which the smartphone 300 can receive one or more portions of the streamed soccer match 302. The assisted delivery server 304 also receives location data associated with the smartphone 300. In this example, the smartphone 300 sends location coordinates to the assisted delivery server 308 that have been obtained via one or more GPS satellites 314. In addition, the assisted delivery server caches location information from the peers 310. This cache may be updated periodically and/or in response to the delivery sending a request to one or more of the peer devices 310 for updated location data. The peer devices 310 may also provide coordinates obtained via one or more GPS satellites 314. In other examples, location data may be inferred from an IP address and/or a MAC address of a Wi-Fi router by, for example, querying a database of IP addresses and/or MAC addresses and associated location data. The assisted delivery server 308 generates discovery data 309 based on the identified peers 310 and the location data 315 and sends the discovery data, via the network 304, to the smartphone 300. The discovery data enables the smartphone 300 to discover at least one of the peer computing devices 310 via a network, in this example the network 304. The discovery data may comprise, for example, an IP address and/or a MAC address of one or more peer computing devices 310. In other examples, the peers may be located via a local network (i.e., a Wi-Fi and/or wired network), which is separate from the internet. In this example, a group of peers 310a are determined to be closest to the smartphone 300. On receiving the discovery data, the smartphone discovers at least one peer device 310 of the peer group 310a and sends a request to a peer device 310 of the peer group 310a for a portion of the media content via the network 304. On receiving the request, the peer device 310 sends the requested portion of the media content via the network 304 to the smartphone 300. An application, such as a media player, running on the smartphone 300 may use the received piece of media content to generate the media content for display. In this example, the user is a passenger in a car 316 and is using their smartphone 300 while the vehicle is in motion. Updated location data is periodically sent from the smartphone 300, via the network 304, to the assisted delivery server 304. In response, if the assisted delivery server 304 identifies a more suitable peer group 310b, based on the updated location, then updated discovery data is sent to the smartphone 300. In a similar manner to before, the smartphone 300 discovers at least one peer 310 of the second peer group 310b and receives at least a portion of the media content from at least one peer of the second peer group 310b. In some examples, the smartphone 300 may receive media content solely from the peer devices 310. In other examples, the smartphone 300 may receive some portions of the media content from the peer devices 310 and other portions of the media content from the edge server 306.

Figure 4:
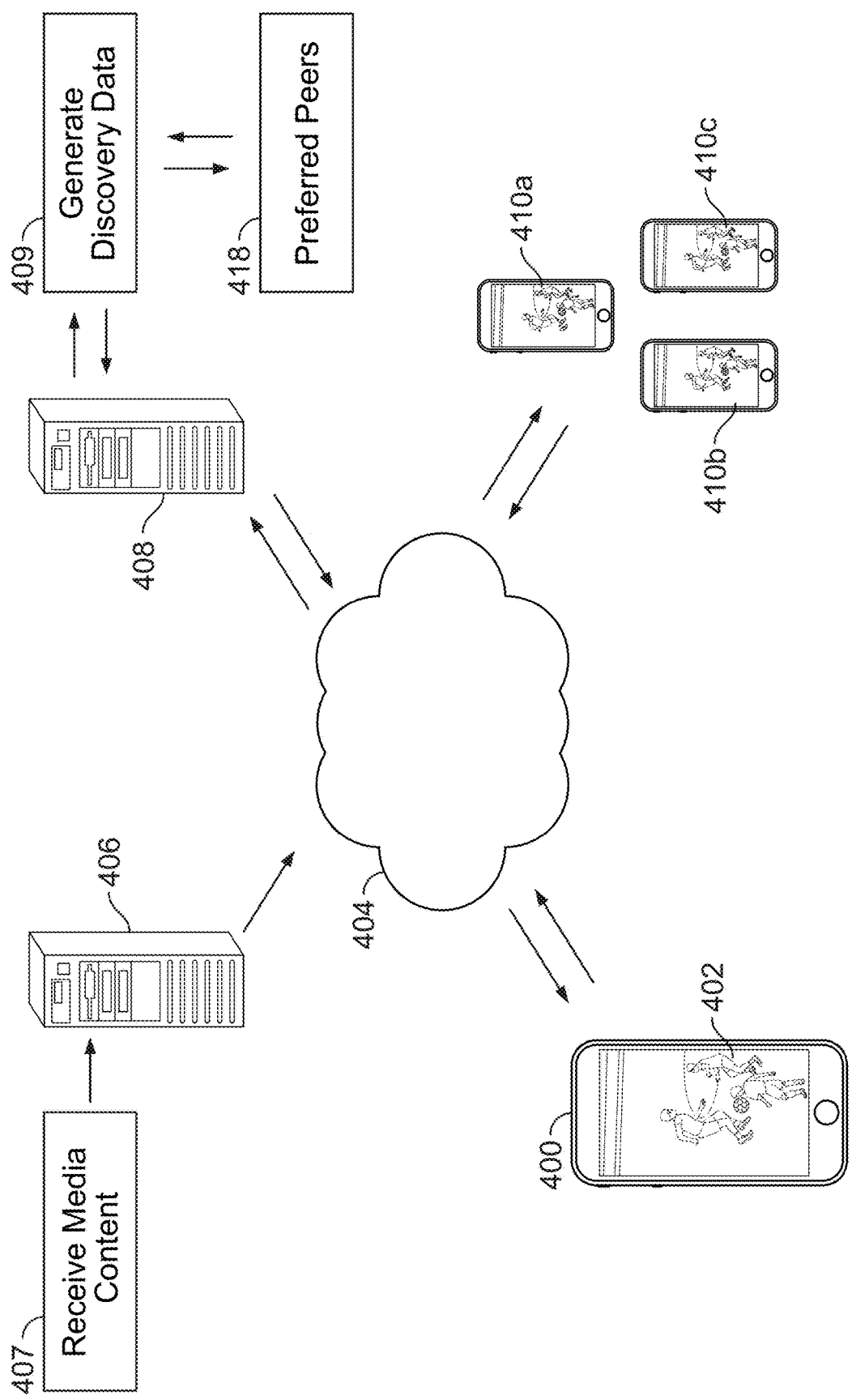
FIG. 4 shows another exemplary environment in which a computing device is switched between an edge server and a peer group, in accordance with some embodiments of the disclosure.

FIG. 4 shows an exemplary environment in which a computing device is switched between an edge server and a peer group, in accordance with some embodiments of the disclosure. The arrangement is similar to that shown in FIG. 1; however, the assisted delivery service takes into account preferred peers. A computing device, in this example a smartphone 400, streams media content, in this example a soccer match 402, via a network 404, from a server, in this example an edge server 406. The edge server 406 receives media content 407 from, for example, a broadcaster. The network 404 may be the internet and may comprise wired and/or wireless means for transmitting the streamed soccer match 402 from the edge server 406 to the smartphone 400. A request for an assisted delivery service is sent, from the smartphone 400, via the network 404, to the assisted delivery server 408. In this example, the assisted delivery server 408 is separate from the edge server 406, but in some examples, the functionality provided by the edge server 406 and the assisted delivery server 408 may be combined at a single server. In some examples, there may be more than one assisted delivery server and the smartphone 400 may send a request to the nearest assisted delivery server and/or the assisted delivery server with the lowest ping. On receiving the request, the assisted delivery server 408 identifies one or more peer computing devices, for example, peer smartphones 410, from which the smartphone 400 can receive one or more portions of the streamed soccer match 402. The assisted discovery server 408 also queries a database of preferred peers 418. For example, the preferred peers may be those peers that have the available bandwidth and computing power that enable them to upload content at a high resolution of, for example, 1920×1080, 3840×2160 and/or 7680×4320. The assisted discovery server 408 may maintain the database of preferred peers 418 by periodically polling peers to ensure that they continue to be able to deliver content in the expected resolution and updating the database accordingly. In other examples, the peers advertise their current capabilities to the assisted delivery server 408. The assisted delivery server 408 generates discovery data 409 based on the identified peers 410 and the preferred peer list and sends the discovery data, via the network 404, to the smartphone 400. The discovery data enables the smartphone 400 to discover at least one of the peer computing devices 410 via a network, in this example the network 404. The discovery data may comprise, for example, an IP address and/or a MAC address of one or more peer computing devices 410. In other examples, the peers may be located via a local network (i.e., a Wi-Fi and/or wired network), which is separate from the internet. On receiving the discovery data, the smartphone identifies those peers that are able to deliver content in a required resolution, for example a maximum display resolution of the smartphone and/or a resolution identified based on a setting set by the user in a user interface of, for example, a media player running on the smartphone; discovers at least one peer device 410 based on the capabilities of the peers; and sends a request to a peer device 410 for a portion of the media content via the network 404. On receiving the request, the peer device 410 sends the requested portion of the media content via the network 404 to the smartphone 400. An application, such as a media player, running on the smartphone 400 may use the received piece of media content to generate the media content for display. In some examples, the smartphone 400 collects statistics on the parts received from the peer devices 410 and if, for example, a peer device 410 consistently fails to deliver parts of the media content in a timely manner then the smartphone 400 may communicate this to the assisted delivery server 408. On receiving the data from the smartphone 400, the assisted delivery server 408 may update the preferred peers database 418 in order to reflect the capacities of the peer devices 410. In some examples, the smartphone requests high resolution content from a first peer device 410a, but also queries second and third peer devices 410b, 410c which are lower down in the preferred peer list. This enables the smartphone 400 to seamlessly (or relatively seamlessly) receive lower resolution content in the event that the network connection between the smartphone and the peer group 410 degrades, for example, if the smartphone moves from an area with a strong cellular signal to an area with a relatively weak cellular signal. The switch to a peer 410b, 410c serving lower resolution content may be made in response to the amount of buffered content at the smartphone 400 falling below a threshold level. In some examples, the smartphone 400 may receive media content solely from the peer devices 410. In other examples, the smartphone 400 may receive some portions of the media content from the peer devices 410 and other portions of the media content from the edge server 406.

In some examples, the maximum display resolution may be determined via a device type communicated in a User-Agent request header that is sent to the assisted delivery server from the computing device. For example, the User-Agent request header may indicate a make and model of the computing device that is requesting header. Based on this information, the assisted delivery server may identify the maximum resolution suitable for the device. For example, the assisted delivery server may query a database of devices and maximum resolutions. Such a database may be stored locally on the assisted delivery server. In other examples, the assisted delivery server may query an internet-based service in order to identify the maximum resolution suitable for the device. In other examples, the User-Agent request header itself may indicate a maximum display resolution that is suitable for a computing device.

Figure 5:
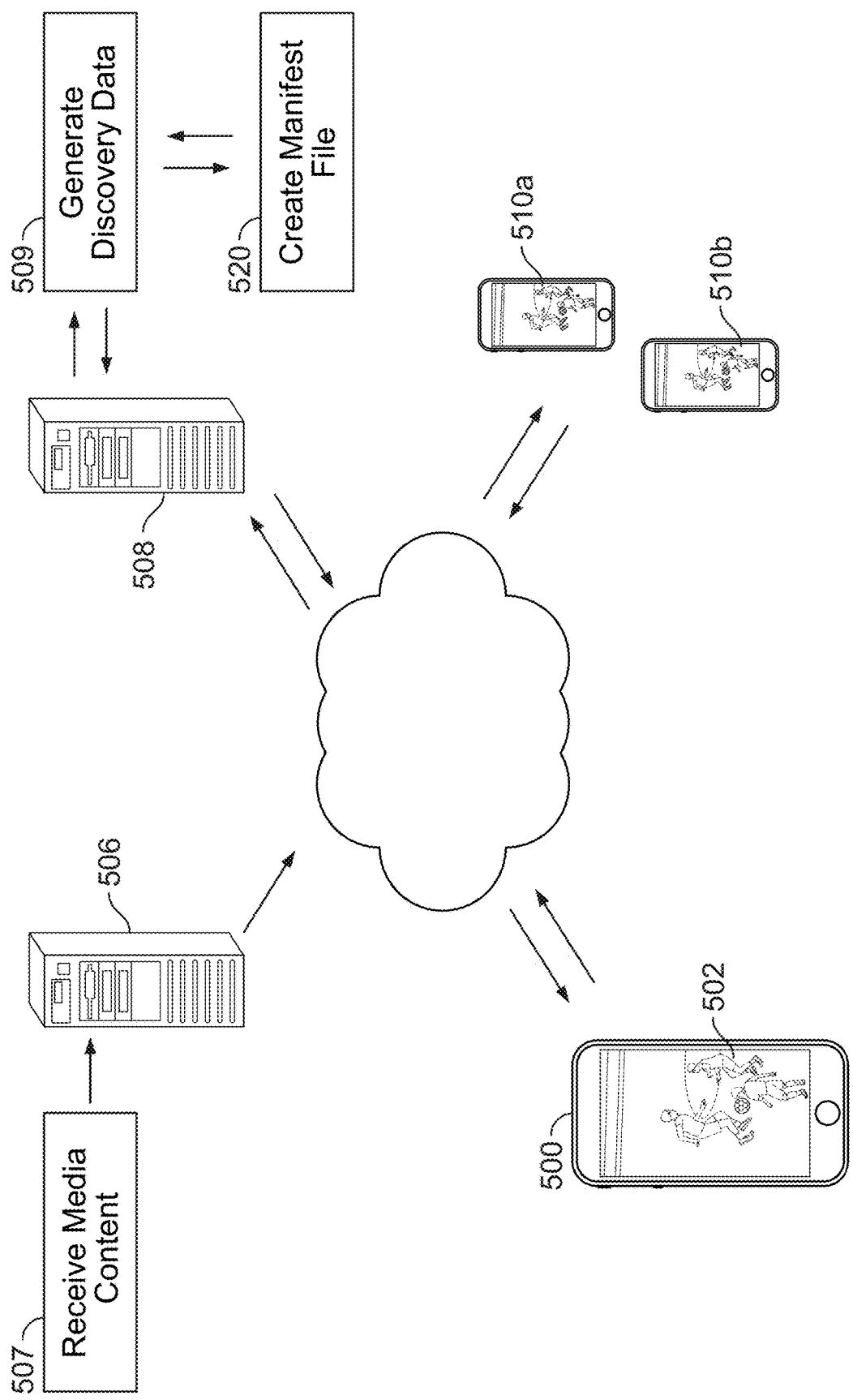
FIG. 5 shows another exemplary environment in which a computing device is switched between an edge server and a peer group, in accordance with some embodiments of the disclosure.

FIG. 5 shows an exemplary environment in which a computing device is switched between an edge server and a peer group, in accordance with some embodiments of the disclosure. The arrangement is similar to that shown in FIG. 1; however, the assisted delivery service creates a manifest file that enables the assisted delivery service to dictate the size of the portions of the media content that are sent from peer devices 510. A computing device, in this example, a smartphone 500 streams media content, in this example a soccer match 502, via a network 504, from a server, in this example an edge server 506. The edge server 506 receives media content 507 from, for example, a broadcaster. The network 504 may be the internet and may comprise wired and/or wireless means for transmitting the streamed soccer match 502 from the edge server 506 to the smartphone 500. A request for an assisted delivery service is sent, from the smartphone 500, via the network 504, to the assisted delivery server 508. In this example, the assisted delivery server 508 is separate from the edge server 506, but in some examples, the functionality provided by the edge server 506 and the assisted delivery server 508 may be combined at a single server. In some examples, there may be more than one assisted delivery server, and the smartphone 500 may send a request to the nearest assisted delivery server and/or the assisted delivery server with the lowest ping. On receiving the request, the assisted delivery server 508 identifies one or more peer computing devices, for example, peer smartphones 510, from which the smartphone 500 can receive one or more portions of the streamed soccer match 502. In addition to identifying peers 510 from which the smartphone 500 can receive portions from the assisted delivery server 508 generates a manifest file 520 for different portion sizes of the media content. The assisted delivery server 508 generates discovery data 509 based on the identified peers 510. The assisted delivery server 508 sends the discovery data and the manifest file 520, via the network 504, to the smartphone 500. The discovery data enables the smartphone 500 to discover at least one of the peer computing devices 510 via a network, in this example the network 504. The discovery data may comprise, for example, an IP address and/or a MAC address of one or more peer computing devices 510. In other examples, the peers may be located via a local network (i.e., a Wi-Fi and/or wired network), which is separate from the internet. The manifest file 520 enables the smartphone 500 to seamlessly (or at least substantially seamlessly) request portions of the media content that are different sizes from the peers 510. The discovery data and the manifest data may be combined at the assisted delivery server 508, such that the smartphone can request a portion of media content of a particular size from a specific peer 510. In other examples, the peers 510 may dynamically adjust the portion size of media content in response to a request from the smartphone 500. On receiving the discovery data, the smartphone discovers at least one peer device 510 and sends a request to a peer device 510 for a portion of the media content of a specific size via the network 504. The request for a specific portion size of media content may be based on, for example, an amount of media content that is present in a buffer at the smartphone 500. In other examples, the size may be based on a peer 510 response time, wherein larger response times dictate smaller portion sizes and smaller response times dictate larger portion sizes. On receiving the request, the peer device 510 sends the requested portion of the media content via the network 504 to the smartphone 500. An application, such as a media player, running on the smartphone 500 may use the received piece of media content to generate the media content for display. In some examples, the smartphone 500 may receive media content solely from the peer devices 510. In other examples, the smartphone 500 may receive some portions of the media content from the peer devices 510 and other portions of the media content from the edge server 506.

Figure 6:
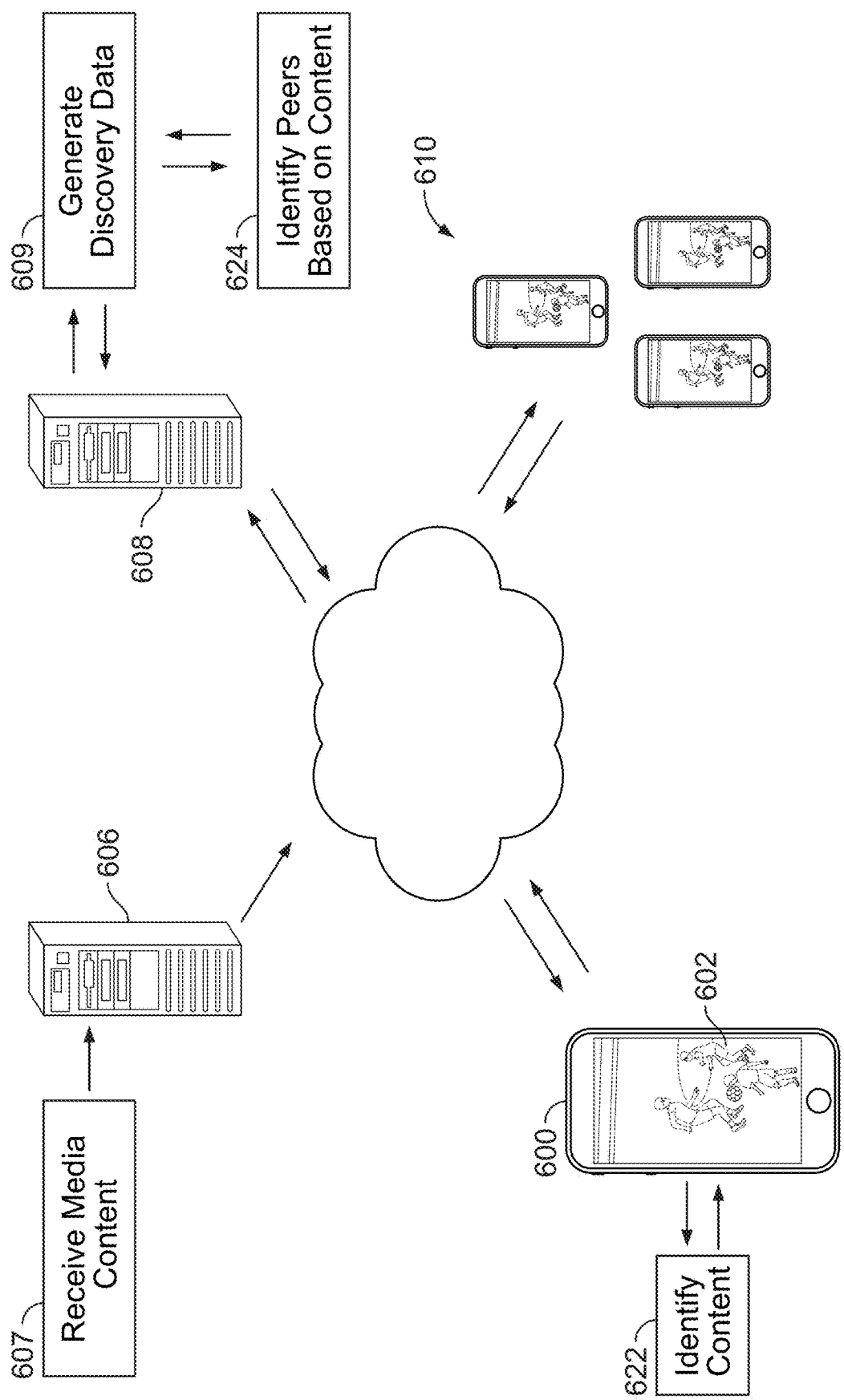
FIG. 6 shows another exemplary environment in which a computing device is switched between an edge server and a peer group, in accordance with some embodiments of the disclosure.

FIG. 6 shows another exemplary environment in which a computing device is switched between an edge server and a peer group, in accordance with some embodiments of the disclosure. The arrangement is similar to that shown in FIG. 1; however, the assisted delivery service takes into account the type of content being streamed. For example, an action movie with many detailed, fast-moving scenes may require substantially higher bandwidth to deliver at a desired resolution than a cartoon. As such, different groups of peers may be suitable for delivering the content. In this example, peers with lower available bandwidth may be more suitable for delivering the cartoon, and peers with higher available bandwidth may be more suitable for delivering the action movie. By delivering the cartoon from peers with lower available bandwidth, the peers with higher available bandwidth may be reserved for users requesting, for example, the action movie. In this way a higher quality of service may be maintained overall. A computing device, in this example a smartphone 600, streams media content, in this example a soccer match 602, via a network 604, from a server, in this example an edge server 606. The edge server 606 receives media content 607 from, for example, a broadcaster. The network 604 may be the internet and may comprise wired and/or wireless means for transmitting the streamed soccer match 602 from the edge server 606 to the smartphone 600. The type of media content 622 is identified at the smartphone 600. This may be performed by parsing, for example, electronic program guide (EPG) data or querying a database via the internet. In other examples, a trained artificial intelligence model may determine the type of content that is being streamed. In some examples, a user may manually input the type of content that is being streamed. A request for an assisted delivery service is sent, from the smartphone 600, via the network 604, to the assisted delivery server 608. In addition, the type of media content that is being streamed is sent from the smartphone 600 to the assisted delivery server 608. In this example, the assisted delivery server 608 is separate from the edge server 606, but in some examples, the functionality provided by the edge server 606 and the assisted delivery server 608 may be combined at a single server. In some examples, there may be more than one assisted delivery server, and the smartphone 600 may send a request to the nearest assisted delivery server and/or the assisted delivery server with the lowest ping. On receiving the request, the assisted delivery server 608 identifies one or more peer computing devices, for example, peer smartphones 610, from which the smartphone 600 can receive one or more portions of the streamed soccer match 602. In addition, the assisted delivery server takes into account the content that is being streamed to the smartphone and identifies the peers 610 based on the content that is being streamed 624. The assisted delivery server 608 generates discovery data 609 based on the identified peers 610 and the identified content 624 and sends the discovery data, via the network 604, to the smartphone 600. In this example, a soccer match 602 requires relatively high bandwidth, so the discover data comprises peers 610 that have reported having relatively high bandwidth available. The discovery data enables the smartphone 600 to discover at least one of the peer computing devices 610 via a network, in this example the network 604. The discovery data may comprise, for example, an IP address and/or a MAC address of one or more peer computing devices 610. In other examples, the peers may be located via a local network (i.e., a Wi-Fi and/or wired network), which is separate from the internet. On receiving the discovery data, the smartphone discovers at least one peer device 610 and sends a request to a peer device 610 for a portion of the media content via the network 604. On receiving the request, the peer device 610 sends the requested portion of the media content via the network 604 to the smartphone 600. An application, such as a media player, running on the smartphone 600 may use the received piece of media content to generate the media content for display. In some examples, the smartphone 600 may receive media content solely from the peer devices 610. In other examples, the smartphone 600 may receive some portions of the media content from the peer devices 610 and other portions of the media content from the edge server 606.

Figure 7:
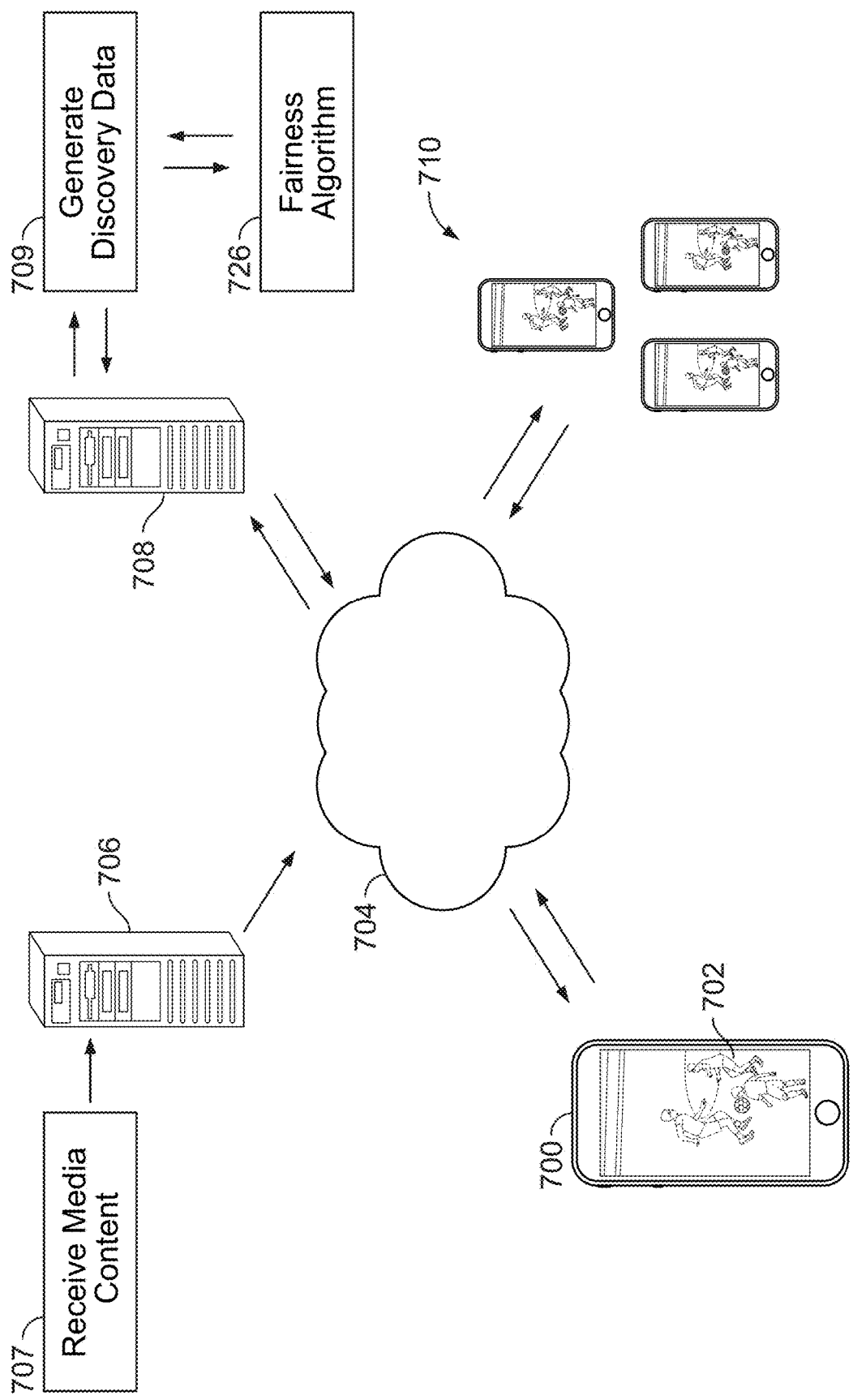
FIG. 7 shows another exemplary environment in which a computing device is switched between an edge server and a peer group, in accordance with some embodiments of the disclosure.

FIG. 7 shows another exemplary environment in which a computing device is switched between an edge server and a peer group, in accordance with some embodiments of the disclosure. The arrangement is similar to that shown in FIG. 1; however, the assisted delivery service takes into account a fairness algorithm 726. For example, peers who consistently upload media content may be prioritized if they utilize the assisted delivery service. A computing device, in this example a smartphone 700, streams media content, in this example a soccer match 702, via a network 704, from a server, in this example an edge server 706. The edge server 706 receives media content 707 from, for example, a broadcaster. The network 704 may be the internet and may comprise wired and/or wireless means for transmitting the streamed soccer match 702 from the edge server 706 to the smartphone 700. A request for an assisted delivery service is sent, from the smartphone 700, via the network 704, to the assisted delivery server 708. In this example, the assisted delivery server 708 is separate from the edge server 706, but in some examples, the functionality provided by the edge server 706 and the assisted delivery server 708 may be combined at a single server. In some examples, there may be more than one assisted delivery server, and the smartphone 700 may send a request to the nearest assisted delivery server and/or the assisted delivery server with the lowest ping. On receiving the request, the assisted delivery server 708 identifies one or more peer computing devices, for example, peer smartphones 710, from which the smartphone 700 can receive one or more portions of the streamed soccer match 702. In addition, the assisted deliver server 708 may take into account a fairness algorithm 726 when identifying peers 710. For example, a user may request content to be delivered at a priority rate in return for committing to uploading received portions of the media content for, for example, a certain period of time to other peers. This may be especially useful if certain portions of the media content are not widely available in the peer group and/or bandwidth is constrained within the peer group. In order to inform the user whether they have uploaded the committed amount of media content, an indication such as a counter can be displayed to the user via a display of the smartphone 700 to indicate to the user that their committed contribution has been met. In another example, based on a previous behavior observed from the smartphone 700, for example only watching portions of media content rather than the whole media content, such a user might be chosen as a "seeder," (i.e., an uploader of media content) or one of the seeders in the peer group, if the network conditions permit. In another example, the order of seeders can be prioritized on clients that are likely to disconnect from the peer group after a short period of time when such potential seeders are capable of serving the content. The fairness algorithm may keep track of all users that have been part of a peer group 710 as well as their overall contributions. For example, a unique ID can be associated with each of the clients based on their device ID. This may be generated based on a device MAC address and/or a device software and hardware profile. A profile can be generated for such user devices that includes their contributions, the number of media content streams they uploaded portions for and/or the number of times that they relied on a peer or a peer group for assisted content delivery. In another example, the peers that are preferred, based on the fairness algorithm, may be rotated or updated throughout the content and/or as network conditions change and as more devices stream the media content, in order to make sure that all peers are contributing to the delivery. The assisted delivery server 708 generates discovery data 709 based on the identified peers 710 and the fairness algorithm and sends the discovery data, via the network 704, to the smartphone 700. The discovery data enables the smartphone 700 to discover at least one of the peer computing devices 710 via a network, in this example the network 704. The discovery data may comprise, for example, an IP address and/or a MAC address of one or more peer computing devices 710. In other examples, the peers may be located via a local network (i.e., a Wi-Fi and/or wired network), which is separate from the internet. On receiving the discovery data, the smartphone discovers at least one peer device 710 and sends a request to a peer device 710 for a portion of the media content via the network 704. On receiving the request, the peer device 710 sends the requested portion of the media content via the network 704 to the smartphone 700. An application, such as a media player, running on the smartphone 700 may use the received piece of media content to generate the media content for display. In some examples, the smartphone 700 may receive media content solely from the peer devices 710. In other examples, the smartphone 700 may receive some portions of the media content from the peer devices 710 and other portions of the media content from the edge server 706.

FIG. 8 shows a block diagram representing components of a computing device and data flow therebetween for switching a computing device between an edge server and a peer group, in accordance with some embodiments of the disclosure. Computing device 800 (e.g., a smartphone 100, 200, 300, 400, 500, 600, 700, as discussed in connection with FIGS. 1-7) comprises input circuitry 804, control circuitry 808 and an output module 826. Control circuitry 808 may be based on any suitable processing circuitry (not shown) and comprises control circuits and memory circuits, which may be disposed on a single integrated circuit or may be discrete components and processing circuitry. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i9 processors) or multiple different processors (e.g., an Intel Core i5 processor and an Intel Core i7 processor) and/or a system on a chip (e.g., a Qualcomm Snapdragon 888). Some control circuits may be implemented in hardware, firmware, or software.

A user provides an input 802 that is received by the input circuitry 804. The input circuitry 804 is configured to receive a user input related to a computing device. For example, this may be via a touchscreen, keyboard, mouse, microphone and/or infra-red controller of the computing device 800. The input circuitry 804 transmits 806 the user input to the control circuitry 808.

The control circuitry 808 comprises a media receiving module 810, an assisted delivery request module 814, a discovery data receiving module 818, a peer discovery module 822 and an output module 826. The user input is transmitted 806 to the media receiving module 810. At the media receiving module 810, media content is received, for example, an audiovisual media file. If an issue, such as buffering, is identified at the media receiving module 810, a request is transferred 812 to the assisted delivery request module 814. The assisted delivery request module 814 transfers the request, via a network, to a second computing device (not shown). The assisted delivery request module 814 transfers 816 an indication to the discovery data receiving module 818 that discovery data is to be received. At the second computing device, discovery data is generated and is transmitted, via the network, to the discovery data receiving module 818. On receiving the discovery data, the discovery data receiving module 818 transmits 820 the discovery data to the peer discovery module 822. The peer discovery module 822 discovers peers that are making portions of the media content available. The peer discovery module transmits 824 an indication to the media portion receiving module 828 that a portion of the media content is to be received. On receiving the portion of media content, the media portion receiving module 828 generates the media content for display.

FIG. 9 is a flowchart of illustrative steps involved for switching a computing device between an edge server and a peer group, in accordance with some embodiments of the disclosure. Process 900 may be implemented on any of the aforementioned computing devices (e.g., smartphone 100, 200, 300, 400, 500, 600, 700). In addition, one or more actions of the process 900 may be incorporated into or combined with one or more actions of any other process or embodiments described herein.

At 902, media content is received at a client computing device from a first computing device. At 904, a request to initiate an assisted delivery service is sent from the client computing device to a second computing device. At 906, the assisted delivery service is initiated at the second computing device in response to the request. At 908, one or more peer computing devices receiving the media content are identified at the second computing device. At 910, discovery data is generated at the second computing device, wherein the discovery data enables the client computing device to discover at least one of the peer computing devices. At 912, discovery data is sent from the second computing device to the client computing device. At 914, a peer computing device is discovered, at the client computing device, based on discovery data. At 916, a request to receive a portion of the media content is sent from the client computing device to a discovered peer computing device. At 918, a portion of the media content is received at the client computing device from the peer computing device.

The processes described above are intended to be illustrative and not limiting. One skilled in the art would appreciate that the steps of the processes discussed herein may be omitted, modified, combined, and/or rearranged, and any additional steps may be performed without departing from the scope of the disclosure. More generally, the above disclosure is meant to be exemplary and not limiting. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for switching computing devices between edge servers and peer groups, the method comprising:
   receiving, at a client computing device and from a first computing device, media content;
   sending, from the client computing device to a second computing device, a request to initiate an assisted delivery service;
   initiating the assisted delivery service at the second computing device in response to the request, wherein the assisted delivery service comprises:
   identifying, at the second computing device, one or more peer computing devices receiving the media content;
   generating, at the second computing device, discovery data that enables the client computing device to discover at least one of the peer computing devices;
   sending, from the second computing device to the client computing device, the discovery data;
   determining, at the client computing device, a maximum display resolution for the media content, wherein the maximum display resolution is the highest resolution that is supported by the client computing device or is based on a setting set at the client computing device;
   discovering, based on the discovery data and at the client computing device, a first peer computing device capable of providing content at the maximum display resolution for the media content and a second peer computing device capable of providing content below the maximum display resolution for the media content;
   sending a request, from the client computing device to the first peer computing device, to receive a first portion of the media content in a first resolution, wherein the first resolution is the maximum display resolution for the media content;
   sending a query, based on the media content, from the client computing device to the second peer computing device;
   receiving the first portion of the media content, at the client computing device, from the first peer computing device and a response to the query from the second peer computing device;
   in response to identifying a number of portions of media content being below a threshold level, sending a request, from the client computing device to the second peer computing device, to receive a second portion of the media content in a second resolution, wherein the second resolution below the maximum display resolution for the media content and the response to the query; and
   receiving the second portion of the media content, at the client computing device, from the second peer computing device.

2. The method of claim 1, wherein the client computing device requests the initiation of the assisted delivery service in response to detecting an error-state when receiving media content from the first computing device.

3. The method of claim 1, wherein:
   initiating the assisted delivery service further comprises sending location data from the client computing device to the second computing device, wherein the location data indicates a location of the client computing device; and
   generating the discovery data further comprises identifying the one or more peer computing devices based on a proximity of the one or more peer computing devices to the client computing device.

4. The method of claim 3 further comprising:
sending updated location data from the client computing device to the second computing device;
identifying, at the second computing device, one or more additional client computing devices based on the updated location data; and
sending, from the second computing device to the client computing device, updated discovery data that enables the client computing device to discover the one or more additional client computing devices.

5. The method of claim 1, further comprising storing at least a portion of the media content in a buffer at the client computing device, and wherein the request to initiate the assisted delivery service is sent when the buffer is storing at least a threshold amount of the media content.

6. The method of claim 1, further comprising:
sending error-state data from the client computing device to the second computing device, wherein the error-state data comprises one or more error-states with respect to the one or more peer computing devices;
identifying, at the second computing device, one or more peer computing devices based on the error-state data;
generating, at the second computing device, updated discovery data that excludes the identified one or more peer computing devices based on error-state data;
sending, from the second computing device to the client computing device, the updated discovery data.

7. The method of claim 1, further comprising:
sending, from the client computing device to the second computing device, data indicating the maximum supported resolution; and
wherein generating the discovery data further comprises identifying the one or more peer computing devices based on whether they enable the media content to be delivered to the client computing device at the maximum resolution.

8. The method of claim 1, further comprising storing at least a portion of the media content in a buffer at the client computing device, and wherein generating the discovery data further comprises indicating a size of the portion of the media content to be received from a peer computing device, wherein the size of the portion is determined based on at least one of the amount of media content stored in the buffer and a peer computing device response time.

9. The method of claim 1, further comprising sending a portion of the media content from the client computing device to a peer computing device.

10. The method of claim 1, wherein generating the discovery data further comprises identifying one or more peer computing devices based on a predetermined ranking.

11. A system for switching computing devices between edge servers and peer groups, the system comprising:
a communication port;
a memory storing instructions; and
control circuitry communicably coupled to the memory and the communication port and configured to execute the instructions to:
receive, at a client computing device and from a first computing device, media content;
send, from the client computing device to a second computing device, a request to initiate an assisted delivery service;
initiate the assisted delivery service in response to the request, wherein the control circuitry configured to initiate the assisted delivery service is configured to:
identify, at the second computing device, one or more peer computing devices receiving the media content;
generate, at the second computing device, discovery data that enables the client computing device to discover at least one of the peer computing devices;
send, from the second computing device to the client computing device, the discovery data;
determine, at the client computing device, a maximum display resolution for the media content, wherein the maximum display resolution is the highest resolution that is supported by the client computing device or is based on a setting set at the client computing device;
discover, based on the discovery data and at the second computing device, a first peer computing device capable of providing content at the maximum display resolution for the media content and a second peer computing device capable of providing content below the maximum display resolution for the media content;
send a request, from the client computing device to the first peer computing device, to receive a first portion of the media content in a first resolution, wherein the first resolution is the maximum display resolution for the media content;
send a query, based on the media content, from the client computing device to the second peer computing device;
receive the first portion of the media content, at the client computing device, from the first peer computing device and a response to the query from the second peer computing device;
in response to identifying a number of portions of media content being below a threshold level, send a request, from the client computing device to the second peer computing device, to receive a second portion of the media content in a second resolution, wherein the second resolution is based on the second capability of the second peer computing device and the response to the query; and
receive the second portion of the media content, at the client computing device, from the second peer computing device.

12. The system of claim 11, wherein the control circuitry configured to initiate the assisted delivery service is further configured to initiate the assisted delivery service in response to the client computing device detecting an error-state when receiving media content from the first computing device.

13. The system of claim 11, wherein:
the control circuitry configured to initiate the assisted delivery service is further configured to send location data from the client computing device to the second computing device, wherein the location data indicates a location of the client computing device; and
the control circuitry configured to generate the discovery data is further configured to identify the one or more peer computing devices based on a proximity of the one or more peer computing devices to the client computing device.

14. The system of claim 13, wherein the control circuitry is further configured to:
send updated location data from the client computing device to the second computing device;
identify, at the second computing device, one or more additional client computing devices based on the updated location data; and
send, from the second computing device to the client computing device, updated discovery data that enables the client computing device to discover the one or more additional computing devices.

15. The system of claim 11, wherein the control circuitry is further configured to store at least a portion of the media content in a buffer at the client computing device, and wherein the control circuitry configured to send the request to initiate the assisted delivery service is further configured to send the request when the buffer is storing at least a threshold amount of the media content.

16. The system of claim 11, wherein the control circuitry is further configured to:
  send error-state data from the client computing device to the second computing device, wherein the error-state data comprises one or more error-states with respect to the one or more peer computing devices;
  identify, at the second computing device, one or more peer computing devices based on the error-state data;
  generate, at the second computing device, updated discovery data that excludes the identified one or more peer computing devices based on error-state data;
  send, from the second computing device to the client computing device, the updated discovery data.

17. The system of claim 11, wherein the control circuitry is further configured to:
  send, from the client computing device to the second computing device, data indicating the maximum supported resolution; and
  wherein the control circuitry configured to generate the discovery data is further configured to identify the one or more peer computing devices based on whether they enable the media content to be delivered to the client computing device at the maximum resolution.

18. The system of claim 11, wherein the control circuitry is further configured to store at least a portion of the media content in a buffer at the client computing device, and wherein the control circuitry configured to generate the discovery data is further configured to indicate a size of the portion of the media content to be received from a peer computing device, wherein the size of the portion is determined based on at least one of the amount of media content stored in the buffer and a peer computing device response time.

19. The system of claim 11, wherein the control circuitry is further configured to send a portion of the media content from the client computing device to a peer computing device.

20. The system of claim 11, wherein the control circuitry configured to generate the discovery data is further configured to identify one or more peer computing devices based on a predetermined ranking.

* * * * *